(12) United States Patent
Gupta

(10) Patent No.: US 6,814,231 B2
(45) Date of Patent: Nov. 9, 2004

(54) STRIP OF COLLATED FASTENERS FOR FASTENER-DRIVING TOOL

(75) Inventor: Harish C. Gupta, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 301 days.

(21) Appl. No.: 10/055,111

(22) Filed: Jan. 23, 2002

(65) Prior Publication Data

US 2003/0136693 A1 Jul. 24, 2003

(51) Int. Cl.⁷ .............................................. B65D 85/24
(52) U.S. Cl. ........................ 206/347; 206/343; 411/443
(58) Field of Search ................................ 206/343–347, 206/338, 560, 564, 820; 24/16 R, 16 PB, 17 R, 17 HP; 411/442–445

(56) References Cited

U.S. PATENT DOCUMENTS

| | | | |
|---|---|---|---|
| 2,877,681 A | | 3/1959 | Brown |
| 3,442,374 A | | 5/1969 | Hiller |
| 3,927,459 A | | 12/1975 | Haytayan |
| 3,944,067 A | | 3/1976 | Bakoledis |
| 3,966,042 A | | 6/1976 | Shelton et al. |
| 3,967,727 A | | 7/1976 | Jakesch |
| 4,024,953 A | * | 5/1977 | Nailor, III ................. 206/344 |
| 4,047,611 A | | 9/1977 | Damratowski |
| 4,106,618 A | | 8/1978 | Haytayan |
| 4,106,619 A | * | 8/1978 | Haytayan .................... 206/346 |
| 4,298,121 A | | 11/1981 | Oide et al. |
| 4,718,551 A | | 1/1988 | Whitledge |
| 4,878,579 A | * | 11/1989 | Hager ........................ 206/0.84 |
| 4,881,643 A | | 11/1989 | Pfister |
| 4,932,821 A | | 6/1990 | Steffen et al. |
| 5,005,699 A | | 4/1991 | Kawashima et al. |
| 5,046,396 A | | 9/1991 | Pfister |
| 5,069,340 A | | 12/1991 | Ernst et al. |
| 5,366,082 A | | 11/1994 | Haytayan |
| 5,775,514 A | * | 7/1998 | Lin ............................ 206/347 |
| 5,836,732 A | | 11/1998 | Gupta et al. |
| 5,865,311 A | | 2/1999 | Hentges et al. |
| 5,931,298 A | * | 8/1999 | Huang ....................... 206/346 |
| 5,931,622 A | | 8/1999 | Gupta et al. |
| 6,036,013 A | * | 3/2000 | Chen ......................... 206/347 |
| 6,044,972 A | | 4/2000 | Rohrmoser et al. |
| 6,135,278 A | | 10/2000 | Rohrmoser et al. |
| 6,250,464 B1 | | 6/2001 | Daubinger et al. |

FOREIGN PATENT DOCUMENTS

EP  1 124 064  8/2001

* cited by examiner

Primary Examiner—Luan K. Bui
(74) Attorney, Agent, or Firm—Lisa M. Soltis; Mark W. Croll; Donald J. Breh

(57) ABSTRACT

In a fastener driving tool, a carrier for holding a plurality of fasteners comprises a plurality of sleeves, each sleeve holding an associated fastener. Each sleeve has a body with an axis and a bore, the bore extending axially through the body and the bore being for receiving the associated fastener. A set of compressible ribs is also included within the bore of the sleeve for gripping a shank of the associated fastener so that the associated fastener is positioned substantially in the axial direction of the sleeve when the fastener is driven. Each rib has a curved portion that is concave with respect to the bore.

19 Claims, 1 Drawing Sheet

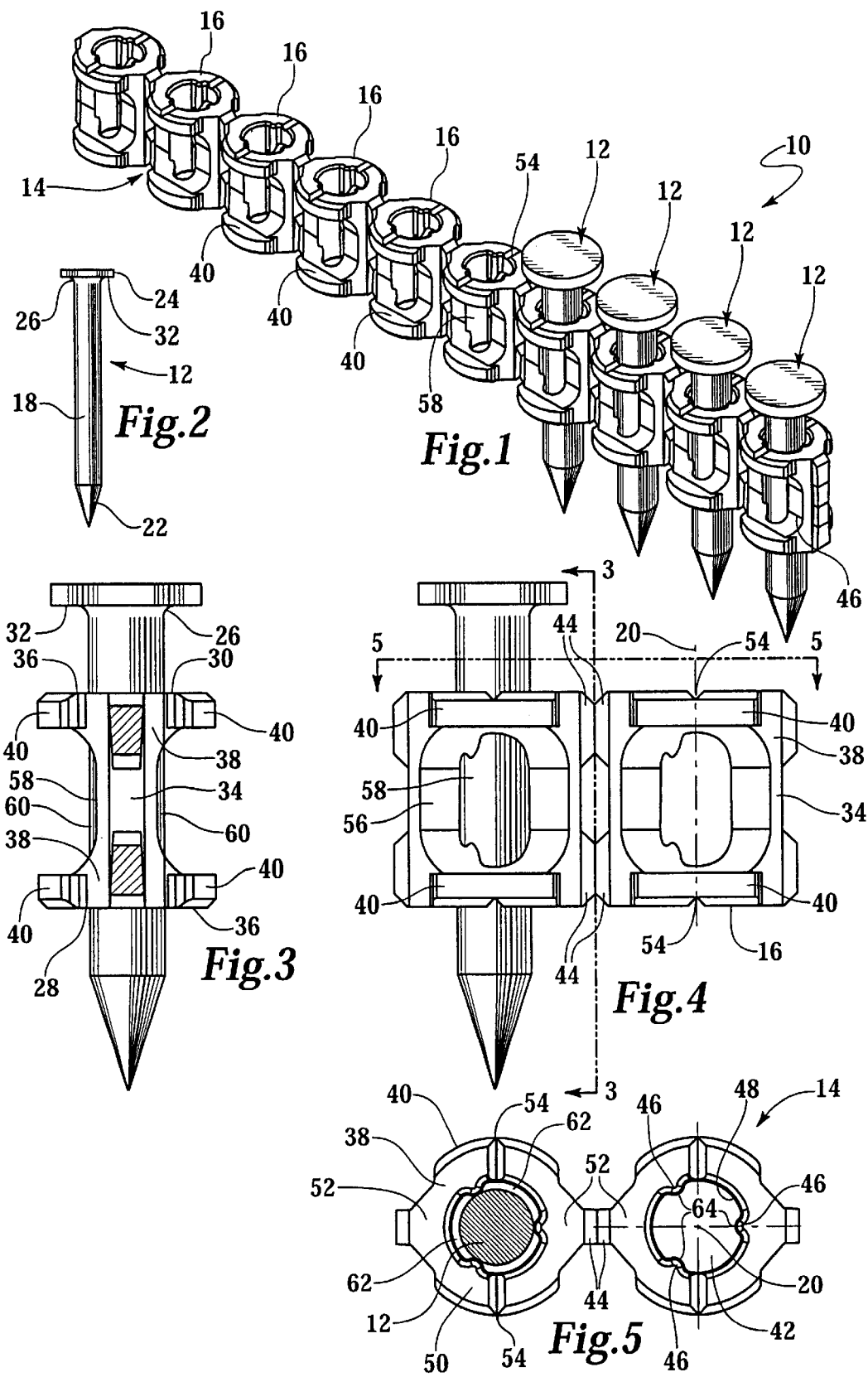

STRIP OF COLLATED FASTENERS FOR FASTENER-DRIVING TOOL

BACKGROUND OF THE INVENTION

1. Field of the Invention

The present invention is also directed to a strip of collated fasteners, such as drive pins, for a fastener driving tool which may be driven by some means such as gasoline combustion or explosive powder.

2. Description of the Related Art

Fastener driving tools, such as combustion powered or explosive powder actuated, are widely used for driving fasteners into a substrate. Such fasteners include drive pins designed to be forcibly driven into concrete, masonry or steel.

Fastener driving tools may use strips or magazines of collated fasteners for quick and easy feeding of the fasteners to the tool. Usually, these strips use a carrier of a molded polymeric material, such as polypropylene or another plastic, with individual sleeves, bushings or holders for each of the fasteners to be collated. Each sleeve may have at least one frangible bridge between its neighboring sleeves to allow each sleeve to part or break away from the carrier easily. U.S. Pat. No. 5,069,340, issued to Illinois Tool Works, discloses a strip of collated fasteners in a set of sleeves having a portion that breaks away as the fastener is driven. U.S. Pat. Nos. 4,106,618, 4,932,821, 6,044,972 and 6,153,340 also disclose examples of strips of sleeves to collate a plurality of fasteners.

In the case of fastener driving tools that exert extreme forces, such as explosive powder actuated tools, it becomes crucial that each fastener be driven in the driving direction of the tool and that the fastener be centered within the bore of the tool as it is being driven. Because of the force supplied by these tools, a fastener should be substantially perpendicular to the substrate, otherwise the fastener could bend or be driven crooked, preventing proper fastening to the substrate, or the fastener could ricochet off of the substrate. For this reason, it is desired to have a strip that ensures that each fastener being driven remains centered within the bore and is driven in the driving direction to ensure proper fastening to the substrate.

BRIEF SUMMARY OF THE INVENTION

It is an object of the present invention to provide a strip having a carrier to collate a plurality of fasteners for a fastener driving tool.

It is another object of the present invention that the carrier ensures that each fastener be centered within a bore of the tool and that each fastener be in the driving direction while the fastener is being driven.

In accordance with the present invention a sleeve for holding a fastener for a fastener driving tool is provided. The sleeve includes a body with an axis and a bore extending through the body, the bore being for receiving an associated fastener. Within the bore is a set of ribs to grip the shank of the fastener to substantially position the fastener in the axial direction of the sleeve when the fastener is driven by the fastener driving tool. Each rib has a curved portion that is convex with respect to the bore and abuts against the shank of the fastener.

In one embodiment of the sleeve, the body has an end having a flared portion with an extension connected to the flared portion. The flared portion of the sleeve extends to a first distance away from the axis of the sleeve, and the extension extends a second distance from the axis of the sleeve.

A plurality of each embodiment of the sleeve can be connected to form a carrier for holding a plurality of fasteners for a fastener driving tool. Between each adjacent sleeves of the carrier is at least one frangible bridge so that each sleeve may break away from its neighboring sleeve as its associated fastener is driven.

An advantage of the present invention is that it ensures that the fasteners of a fastener driving tool be driven perpendicular to a substrate to ensure that each fastener is securely fastened to the substrate. The novel design of the present invention ensures the proper fastening to the substrate while still having a simple design allowing a single fastener or a strip of collated fasteners.

This and other objects, features and advantages are evident from the following description of an embodiment of the present invention, with reference to the accompanying drawings.

BRIEF DESCRIPTION OF THE SEVERAL VIEWS OF THE DRAWINGS

FIG. 1 is a perspective view of the carrier of a strip of collated fasteners (with four fasteners shown).

FIG. 2 is a side view of a representative fastener used in the strip.

FIG. 3 is an enlarged side view of a sleeve with a fastener taken along line 3—3 of FIG. 4.

FIG. 4 is an enlarged side view of two sleeves of the carrier (with a fastener shown).

FIG. 5 is an enlarged view of partly a top view of two sleeves of the carrier and partly a sectional view of a fastener taken along line 5—5 of FIG. 4.

DETAILED DESCRIPTION OF THE INVENTION

Referring now to FIG. 1, a novel and improved strip 10 of collated fasteners 12 for use in a fastener driving tool is shown. Strip 10 could be used in several types of fastener driving tools, but it is preferable that strip 10 be used in a tool that is actuated by explosive powder. Each strip 10 includes a carrier 14 having a plurality of sleeves 16, each sleeve 16 holding an associated fastener 12. Each sleeve 16 is also novel and improved, and the present invention is not limited to a plurality of sleeves 16 holding a plurality of fasteners 12.

Each fastener 12 includes an elongated shank 18 and each sleeve 16 advantageously grips shank 18 of associated fastener 12 to keep fastener 12 centered within 42 of sleeve 16 and in a proper orientation so that fastener 12 is in alignment with a central axis 20 passing through sleeve 16.

A representative fastener 12 is shown in FIG. 2. Each fastener 12 is a drive pin, which may be made from hardened steel. Each fastener 12 is designed to be forcibly driven into a substrate (not shown), such as a concrete or steel. Each fastener 12 has an elongated shank 18, a pointed end 22, and a head 24. The shank 18 is cylindrical except for a flared portion 26 where the shank 18 adjoins the head 24. The pointed end 22 is conical in shape. A plurality of fasteners 12 is placed within carrier 14, with one fastener 12 being placed within each sleeve 16 so that the fasteners 12 lie generally in a common plane.

As each fastener 12 is driven by a fastener driving tool, associated sleeve 16 separates from its neighboring sleeve and is driven along with the fastener until the surface 28 of sleeve 16 nearest to pointed end 22 comes into contact with the substrate (not shown). When this happens, fastener 12 begins to move within associated sleeve 16 until flared portion 26 of fastener 12 comes into contact with surface 30 of sleeve 16 nearest to head 24. Flared portion 26 acts as a wedge and splits sleeve 16. Because of the large and violent forces associated with explosive powder actuated tools, each sleeve 16 usually becomes completely dislodged from fastener 12 so that bottom surface 32 of head 24 of fastener 12 is flush against the substrate. Each fastener 12 should be driven perpendicular to the substrate to ensure the fastener 12 properly attaches to the substrate and to avoid the fastener 12 from ricocheting off of the substrate.

Each sleeve 16 of carrier 14 includes a body 34 having an axis 20 and two ends 36 wherein each end 36 includes a flared portion 38. At least one flared portion 38 of each sleeve 16 has a pair of extensions 40. Extensions 40 act to guide the plurality of sleeves 16 of carrier 14 along a guide rail (not shown) in a fastener driving tool. The method by which extensions 40 guide carrier along a guide rail may be similar to the method disclosed in Ernst et al. U.S. Pat. No. 5,069,340, the disclosure of which is incorporated herein by reference.

Each sleeve 16 also includes a bore 42 passing through body 34 and flared portions 38 of sleeve 16 and at least one frangible bridge 44 between adjacent sleeves 16 so that each sleeve can separate from adjacent sleeves 16 when associated fastener 12 is driven. Within bore 42 is a set of ribs for gripping shank 18 of fastener 12. Ribs 46 extend radially inward from interior wall 48 of bore 42 to grip shank 18 of fastener 12 and retain fastener 12 in a predetermined position with a predetermined orientation.

As shown in FIG. 5, each flared portion 38 has the general shape of an annulus. Although two flared portions 38 are shown for each sleeve 16, the present invention is not limited to two flared portions 38. Only one flared portion 38 on either end 36 of sleeve 16 could be used without varying from the scope of the invention. Extensions 40 extend outwardly from flared portion 38 to a greater distance away from the plane formed by the plurality of fasteners 12 than flared portion 38 extends. FIGS. 1, 3 and 4 show each flared portion 38 of each sleeve 16 having a pair of extensions 40, but the present invention is not limited to a pair of extensions 40 for each flared portion 38. For example, only the top flared portion 38 of each sleeve could have a single extension 40 or a pair of extensions 40, and sleeves 16 of carrier could still be guided along a guide rail without varying from the scope of the present invention.

In one embodiment, flared portion 38 has a rounded section 50 which has a cross-section that is generally circular in shape. The rounded section 50 is adjacent to trapezoidal sections 52 as shown in FIG. 5. Flared portion 38 may also include notches 54 in surface 30 or surface 28, or both, of flared portion 38 and extensions 40. Notches 54 are generally V-shaped, as shown in FIG. 3, and aid in the splitting of sleeve 16 as fastener 12 is driven into a substrate, as described above.

In one embodiment, each sleeve 16 has two concave recesses 56 between ends 36 that open outwardly away from the plane formed by fasteners 12. Recesses 56 can be curved, as shown in FIG. 3, or they can have straight edges. Each recess 56 may also include a window 58 which is also outwardly opening away from the plane formed by fasteners 12 and is of the same general concave shape as recess 56. As shown in FIG. 3, a portion 60 of shank 18 of associated fastener 12 emerges from each window 58.

Bore 42 of each sleeve 16 is generally cylindrical except for ribs 46 extending inward toward axis 20 from interior wall 48 of bore 42. The diameter of bore 42 is slightly larger than the diameter of shank 18 of fastener 12 so that there are spaces 62 between shank 18 and interior wall 48 of bore 42, as shown in FIG. 4.

Ribs 46 extend into bore 42 so that the effective diameter of bore 42 is slightly smaller than the diameter of shank 18. At least a portion of each rib 46 is compressible so that when fastener 12 is placed into sleeve 16, ribs 46 are compressed away from axis 20 creating a relatively tight grip between ribs 46 and shank 18 of fastener 12. It is this grip between ribs 46 and shank 18 that holds fastener 12 in a proper, predetermined position that is radially centered within bore 42 of sleeve 16 and orientated so that shank 18 is substantially aligned with central axis 20 of sleeve 16. Preferably, at least a portion of each rib 46 can be compressed away from axis 20 by shank 18, and each rib 46 can return to its original state when shank 18 is removed.

In one embodiment, at least a portion 64 of each rib 46 is curved and is convex with respect to bore 42 as shown in FIG. 5. It is the curved portion 64 of each rib 46 that is compressible, and is compressed by shank 18 when fastener 12 is inserted into sleeve 16, and it is the compression of these curved portions 64 that provides a grip to ensure that fastener 12 remains centered within bore 42 and that shank 18 remains substantially parallel to axis 20, so that fastener 12 can be driven perpendicular to the substrate.

At least one rib 46 extends substantially through bore 42 in the axial direction to provide substantial support to stabilize shank 18 of fastener 12 to ensure that the entire length of shank 18 remain parallel to axis 20 in the axial direction of sleeve 16. In one embodiment, at least one rib 46 extends through the entire length of bore 42 in the axial direction of sleeve 16.

It is preferred that ribs 46 be evenly spaced around the periphery of bore 42 so that the force supplied by the ribs 46 onto shank 18 be uniform across the entire circumference of shank 18. For example, in the case of three ribs 46 as shown in FIG. 5, each rib 46 should be about 120° from each of its neighboring ribs 46. If four ribs 46 are used, they should be about 90° apart. Three ribs 46, as shown in FIG. 5, are preferred because it has been found that three ribs, evenly spaced at 120°, provide the highest level of stability around the periphery of fastener 12.

It is preferred that each sleeve 16 be symmetrical about a plane perpendicular to axis 20, the plane bisecting each sleeve 16 at a midpoint between ends 36 of each sleeve. If each sleeve 16 is symmetrical as described above, than carrier 14 will also be symmetrical about the plane described above so that a fastener 12 can be placed into either end 36 of an associated sleeve 16 and sleeve 16 and fastener 12 will still function properly.

Sleeves 16 of carrier 14 should be constructed out of a frangible material so that each sleeve 16 will disengage from its neighboring sleeves at bridges 44 easily, and so that each sleeve 16 will break away from its associated fasteners 12 as fastener 12 is being driven. It is preferred that the material of construction of carrier 14 also be inexpensive, such as a molded polymeric material such as polypropylene or another plastic.

Each novel and improved sleeve 16 of the present invention provides a means for delivering a fastener 12 to a fastener driving tool so that the fastener 12 will remain perpendicular to the desired substrate, ensuring that the fastener 12 is properly driven into the substrate. Carrier 14 of a plurality of sleeves 16 of the present invention provides a means of creating a novel and improved strip 10 of collated fasteners 12 and provides a means of delivering each of a plurality of fasteners 12 to a fastener driving tool to drive the fasteners 12 into a substrate while keeping each fastener 12 in the driving direction of the tool to ensure that each fastener 12 is properly driven in the substrate, and so that each fastener properly attaches to the substrate.

The present invention is not limited to the above-described embodiments, but should be limited solely by the following claims.

What is claimed is:

1. A sleeve and pin assembly for use in a pin driving tool comprising:
    a drive pin for driving into a substrate, said drive pin having a shank;
    a body having an axis and a bore, the bore extending axially through the body, the bore being for receiving the drive pin, wherein said body breaks away from said drive pin as said drive pin is driven into said substrate; and
    a set of compressible ribs within the bore for gripping the shank of the drive pin, at least one rib extending substantially through the bore in the axial direction, so that the drive pin is aligned substantially in the axial direction of the body when the drive pin is forcibly driven by said pin driving tool, wherein each rib abuts against the shank of the drive pin.

2. A sleeve and pin assembly according to claim 1, wherein each rib has a curved portion that is convex with respect to the bore, the curved portion being compressible and abutting against the shank of the drive pin.

3. A sleeve and pin assembly according to claim 1, wherein the body comprises three ribs.

4. A sleeve and pin assembly according to claim 1, wherein the body comprises four ribs.

5. A sleeve and pin assembly according to claim 1, wherein the body is molded from a polymeric material.

6. A sleeve and pin assembly according to claim 1, wherein the body is molded from polypropylene.

7. A sleeve and pin assembly according to claim 1, wherein the body is connected by a frangible bridge to an adjacent body, such that the bodies form a carrier for holding a plurality of drive pins.

8. A sleeve and pin assembly according to claim 1, wherein each sleeve further comprises notches to aid in the breaking of said body.

9. A sleeve and pin assembly according to claim 1, wherein said body further comprises two ends with an annular flared portion at each end, and a concave recess between said ends.

10. A sleeve and pin assembly for use in a pin driving tool comprising:
    a drive pin for driving into a substrate, said drive pin having a shank;
    a body having an axis and a bore, the bore extending axially through the body, the bore being for receiving the drive pin, wherein said body is driven with said drive pin and said body breaks away from said drive pin as said drive pin is driven into said substrate; and
    a set of ribs within the bore for gripping the shank of the drive pin, at least one rib extending substantially through the bore in the axial direction, so that the drive pin is aligned substantially in the axial direction of the body when the drive pin is forcibly driven by said pin driving tool, wherein each rib abuts against the shank of the drive pin;
    wherein each rib has a curved portion that is convex with respect to the bore, the curved portion being compressible and abutting against the shank of the drive pin.

11. A sleeve and pin assembly according to claim 10, wherein the body comprises three ribs.

12. A sleeve and pin assembly according to claim 10, wherein the body comprises four ribs.

13. A sleeve and pin assembly according to claim 10, wherein the body is connected by a frangible bridge to an adjacent body, whereby the bodies form a carrier for holding a plurality of drive pins.

14. A strip of drive pins for use in a pin driving tool comprising:
    a plurality of drive pins for driving into a substrate, each one of said plurality of drive pins having a shank;
    a carrier having a plurality of sleeves, each sleeve for holding an associated drive pin and having a body with an axis and a bore, the bore extending axially through the body, the bore being for receiving the associated drive pin, wherein each one of said plurality of sleeves is driven with said associated drive pin and breaks away from said associated drive pin as said associated drive pin is driven into said substrate;
    a set of compressible ribs within the bore of each sleeve for gripping the shank of the associated drive pin, at least one rib of each sleeve extending substantially through the bore of the sleeve in the axial direction, so that the associated drive pin is aligned substantially in the axial direction of the sleeve when the drive pin is forcible driven by said pin driving tool, wherein each rib abuts against the shank of the associated drive pin; and
    at least one frangible bridge between adjacent sleeves of the carrier.

15. A strip of drive pins according to claim 14, wherein each rib of each sleeve has a curved portion that is convex with respect to the bore, and the curved portion being compressible and abutting against the shank of the associated drive pin.

16. A strip of drive pins according to claim 14, wherein each sleeve comprises three ribs.

17. A strip of drive pins according to claim 14, wherein the carrier is molded from a polymeric material.

18. A strip of drive pins according to claim 14, wherein the carrier is molded from polypropylene.

19. A strip drive pins for use in pin driving tool comprising:
    a plurality of drive pins for driving into a substrate, each drive pin having a shank;
    a carrier having plurality of sleeves, each sleeve for holding an associated drive pin and having a body with an axis and a bore, the bore extending axially through the body, the bore being for receiving the associated drive pin, wherein each one of said plurality of sleeves breaks away from said associated drive pin as said associated drive pin is driven into said substrate;
    a set of compressible ribs within the bore of each sleeve for gripping the shank of the associated drive pin, at least one rib of each sleeve extending substantially through the bore of the sleeve in the axial direction, so that the associated drive pin is aligned substantially in the axial direction of the sleeve when the drive pin is forcibly driven by said pin driving tool, wherein each rib of each sleeve has a curved portion that is convex with respect to the bore, and the curved portion is compressible and abuts against the shank of the associated drive pin; and
    at least one frangible bridge between adjacent sleeves of the carrier.

* * * * *